United States Patent [19]

Shannon et al.

[11] Patent Number: 4,795,336

[45] Date of Patent: Jan. 3, 1989

[54] LABORATORY SCALE REACTION INJECTION MOLDING

[75] Inventors: David M. Shannon, Midland; Michael R. Savina, Auburn; Ira M. Thumma, Shepherd, all of Mich.

[73] Assignee: The Dow Chemical Company, Midland, Mich.

[21] Appl. No.: 146,946

[22] Filed: Jan. 22, 1988

[51] Int. Cl.[4] .................................. B29C 45/18
[52] U.S. Cl. .................................. 425/145; 137/98; 222/134; 222/135; 264/328.6; 422/112; 422/133; 425/543
[58] Field of Search .............. 425/145, 146, 149, 542, 425/543, 585, 586; 264/328.6; 222/134, 135, 255, 275, 309, 278; 137/98; 422/111, 112, 130, 131, 133

[56] References Cited

U.S. PATENT DOCUMENTS

| | | | |
|---|---|---|---|
| 2,318,031 | 5/1943 | Tucker | 425/543 X |
| 2,530,289 | 11/1950 | Cook | 425/543 X |
| 3,386,623 | 6/1968 | Berrill et al. | 222/135 X |
| 3,632,022 | 1/1972 | Simmonds, Jr. et al. | 222/134 |
| 3,642,175 | 2/1972 | Robbins | 222/255 X |
| 3,814,289 | 6/1974 | Robbins | 222/275 X |
| 4,167,236 | 9/1979 | Taubenmann | 222/135 |
| 4,189,070 | 2/1980 | Macosko et al. | 222/309 X |
| 4,281,777 | 8/1981 | Akens | 222/134 |
| 4,286,732 | 9/1981 | James et al. | 222/135 X |
| 4,314,963 | 2/1982 | Boden et al. | 264/328.6 |
| 4,399,105 | 8/1983 | Tilgner et al. | 422/133 X |
| 4,565,511 | 1/1986 | Ramisch | 137/98 X |
| 4,616,978 | 10/1986 | Matheson et al. | 222/135 X |
| 4,688,944 | 8/1987 | Mumenthaler | 222/135 X |

Primary Examiner—Richard L. Chiesa

[57] ABSTRACT

A RIM apparatus has a separate hydraulically actuated monomer dispensing system associated with one of at least two different fluid chemical monomers to be mixed and molded. Each system is connected with a separate hydraulic fluid delivery cylinder (one for each monomer) for receiving hydraulic fluid therefrom and is operable for dispensing the associated monomer to a RIM mixing head and mold at a rate proportional to the rate that said hydraulic fluid is delivered thereto from the connected delivery cylinder. Each delivery cylinder is supported at a preselected position with its axis spaced radially from a reference axis and at least one thereof is bodily adjustable radially with respect to said reference axis and to the axis of another delivery cylinder. Each delivery cylinder discharges hydraulic fluid at a rate proportional to the rate of movement of an associated piston therein. A power driven operator is engaged with each said associated piston for effecting said movement at a rate proportional to the distance between the axis of the associated delivery cxylinder and said reference axis. Valve means enables selective interconnection between the delivery cylinders and dispensing systems in various combinations.

18 Claims, 2 Drawing Sheets

LABORATORY SCALE REACTION INJECTION MOLDING

The present invention is concerned with a method and apparatus for reaction injection molding (RIM) on a laboratory scale under realistic commercial processing conditions.

BACKGROUND AND OBJECTS:

The flexibility and attractive economics of RIM has created intense interest in the development of improved RIM processes within the industry and also in the development of RIM processible polymeric materials, including both improved urethane/urea and non-urethane/urea formulations. Inasmuch as the performance of polymeric materials produced by RIM is sensitive to the molding or processing conditions, the proper screening and evaluation of new RIM processed materials requires molding or processing under commercially realistic conditions. The smallest commercial RIM equipment currently available requires seven to ten liters of each monomer component in order to produce a single test specimen. In a research environment, the preparation of such large amounts of monomer is time consuming and expensive. There is accordingly an important need for a laboratory scale RIM apparatus capable of operating comparably to existing commercial RIM apparatus, but which only requires a comparatively small amount of each monomer component, say for example, one liter.

RIM requires the simultaneous injection under pressure of precisely controlled quantities of two or more monomer components into a mixing head fitted to a mold, whereby the pressurized components are mixed and then directed into the mold cavity. Among the problems encountered heretofore, no apparatus has been available for delivering the separate monomers to the mixing head in comparatively small, precisely proportioned quantities. Even when the supply lines for the RIM apparatus are initially filled with the monomers to be molded various time consuming interactions, feedback reactions, and mechanical play or lost motion between linkages in conventional RIM apparatus require the delivery of a minimum of several liters of each of the pressurized monomers into the RIM apparatus to obtain the steady flow rates and molding pressure required for precisely proportioned delivery of each monomer into the mold cavity.

It is accordingly an important object of the invention to provide an improved method and apparatus for achieving realistic commercial RIM processing conditions while requiring comparatively small amounts of each monomer for a complete molding operation. The term "monomer" as used herein means any fluid chemical formulation capable of reacting with one or more other monomers in a RIM apparatus.

Another important object is to provide improved apparatus for delivering two or more monomers to a RIM mixing head in precisely predetermined proportions, and which is readily adjustable for varying the proportions in any desired relationship.

In accordance with a more specific object, a longitudinally extensible lever pivotally mounted at one end for swinging about the axis of a fixed pivot is operatively connected with the piston rod of a primary piston and cylinder assembly. Hydraulic fluid is supplied at a metered rate to the primary cylinder to drive the piston therein and swing the lever about the fixed pivot. Each of two or more hydraulic driven piston and cylinder assemblies has a piston rod connected with a driven piston for discharging hydraulic fluid from the associated cylinder. Each driven piston is also operatively connected with the extensible swinging lever at a predetermined position spaced from the fixed pivot along the length of the lever, such that the connected driven piston is moved to discharge hydraulic fluid from the associated cylinder at a rate proportional to the distance of the fixed pivot from the operative connection of the piston rod with the lever.

A separate driven piston and cylinder assembly is provided for each component monomer required for the resulting RIM polymer and at least one is an adjustable driven assembly moveable bodily with respect to the axes of the fixed pivot and cylinders of the other driven assemblies to enable adjustable spacing of its operative connection with the lever and thereby to enable adjustment of the ratio of hydraulic fluid discharged from the cylinder of the adjustable driven assembly with respect to the cylinders of the other driven assemblies.

The hydraulic fluid discharged from the cylinder of each driven assembly is conducted into a corresponding hydraulic lance drive cylinder for driving a lance piston therein at a rate proportional to the rate that such fluid is discharged from the driven assembly. A lance connected with each lance piston and of smaller cross sectional area extends in sealing relationship from the lance drive cylinder into a component delivery cylinder for amplifying the pressure of fluid monomer component within the delivery cylinder and also for discharging the component therefrom at the amplified pressure into the supply conduit for the mold cavity and at a rate proportional to the rate of travel of the lance piston.

Another important object is to provide a hydraulic connection between each driven assembly and each lance drive cylinder, whereby simple valve switching means can be employed to connect the cylinder of any driven assembly with any lance drive cylinder. Thus in a two component RIM system for example, hydraulic fluid can be supplied selectively to either lance drive cylinder in ratios ranging from 1:1 to 1:0. Such versatility of operation is especially desirable under laboratory conditions where monomer components A and B for a first test polymer might be required in a 5:6 ratio and in a 6:5 ratio for a second test polymer. Without the provision of the valve switching means, in order to deliver component A in the smaller proportion for the first test polymer and thereafter in the higher ratio for the second test polymer, it would be necessary either to provide the component delivery cylinders with replaceable sleeves to change their relative cross sectional areas, or to clean the component delivery cylinders thoroughly and thereafter interchange the component monomers in the two delivery cylinders. Thorough cleaning is emphasized because if some of monomer A remains that is intended to be replaced in the delivery cylinder by monomer B, the resulting reaction will spoil the test sample and possibly clog the supply lines in the RIM apparatus.

The several component delivery cylinders, one for each monomer required for the molded polymer, are each initially filled completely with the monomer to be discharged therefrom. Likewise all of the hydraulic cylinders and connecting lines are completely filled. The various connections between the pistons and their connecting rods are preferably rigid, the various pivotal connections required are manufactured to close tolerances to eliminate play or lost motion in the associated connections, and a comparatively conventional non-compressibile hydraulic fluid is employed in the hydraulic circuits. Accordingly the lance drive and component delivery cylinders may be located closely to the mold, independently of the location of the ratio proportioning fluid delivery cylinders, assuring a minimum length of component supply lines to the mold.

The close tolerances in the few connections involved, the pressure magnification obtained by the use of the lances for forcing the monomers from the component delivery cylinders into the supply conduits to the mold cavity, and the elimination of various factors noted above and responsible for increasing the time required and consequent wasted monomer before attainment of operature pressure, say 2000 psi (pounds per square inch) to possibly 3500 psi, enable an almost instant build-up of pressure and flow rate to operating conditions in the short component supply lines employed and rendered feasible by the arrangement described. In fact, the primary delay in attainment of operating pressure results from the inevitable swelling of the pressurized component delivery system as the high operating pressure is reached. Such swelling and the quantity of unuseable components in the supply lines is further minimized by using small steel, say half-inch, diameter supply lines.

Inasmuch as mixing of the monomers is critical in order to obtain uniform RIM polymer test samples, a commercial mix head is preferred. All in all, an inventory of approximately 300 cc at most of each monomer is required to fill the lines to the mold, which inventory cannot be used to make a polymer. A mixing head valve, referred to herein as a wipe piston, is employed to prevent flow of the monomers into the mold until the steady state flow rate at the desired molding pressure is obtained. An initial liter of each monomer will thus provide 700 cc of useable monomer, sufficient to produce essentially ten 4"×8"×0.125" polymer plaques for testing.

When a predetermined steady pressure and flow rate are obtained in the lines to the mold, the valve closing the mold entry is opened and the pressurized monomers rush into the mixing head, then into an after mixer which may comprise part of the mold and which affects additional mixing, and then into the mold where the molding operation is completed in accordance with conventional practice.

Other objects of this invention will appear in the following description and appended claims, reference being had to the accompanying drawings forming a part of this specification wherein like reference characters designate corresponding parts in the several views.

THE PRIOR ART

Although no prior art is known to applicants that employs the simple and versatile metering system of the present invention, nor any RIM system that utilizes a direct hydraulic connection between the metering system and the component delivery system, nor such a system that directly amplifies the component delivery pressures as required for the RIM operation, while maintaining the proportionate delivery of the components, as accomplished by the lance type component pressure intensifiers that comprise the component pressure delivery system of the present invention, the following patents illustrate the state of the art and its development:

| | |
|---|---|
| 3,386,623 | Berrill, et al |
| 3,632,022 | Simmonds, Jr. et al |
| 3,642,175 | Robbins |
| 3,814,289 | Robbins |
| 4,189,070 | Macosko, et al |
| 4,286,732 | James, et al |

Berrill is typical of the prior art and illustrates a comparatively complex adjustable linkage 35 connecting a master cylinder 31 with feed cylinders 17 and 24 for effecting proportionate delivery of the components to be molded. Berrill does not disclose any proportioning system comparable to applicants hydraulic ratio system, comprising a longitudinally or radially extensible swinging lever pivotable about a fixed pivot, in combination with a fixed cylinder having its piston connected with the swinging end of the lever, and a cylinder adjustable bodily with respect to the axes of both the fixed pivot and the fixed cylinder, such that the piston in the adjustable cylinder can be connected with the lever at positions along its length to effect proportioned piston travel in the two cylinders in any ratio in response to swinging of the lever, i.e., wherein the piston movement in the adjustable cylinder can range from zero to 100% of the piston movement in the fixed cylinder, depending upon the radial distance of the adjustable connection along the lever from the fixed pivot.

Simmonds, Jr. et al provides a device for supplying reactive material to a mold from separate sources, but is in no other manner concerned with the present invention. Simmonds et al avoids the concept of an adjustable link connecting the separate dispensing cylinder by adjustably locating switches for controlling the stroke of the pistons within the cylinders.

Robbins —175 and —289 show similar ratio proportioning devices, wherein the axes of all of the dispensing cylinders are fixed. Their pistons are connected to a swinging lever having a pivot adjustably supported at one end for supplying reactive material in varying proportions to a mixing head. Such a proportioning system lacks the compactness and versatility of the present invention and cannot feasibly provide ratio proportioning throughout an infinite range.

Macosko illustrates an adjustability concept somewhat similar to Robbins and adjusts the location of pivot 29 to vary the ratio of piston travel in the cylinders 16 and 17. Similarly to Robbins, Macosko does not shift an adjustable delivery cylinder bodily with respect to fixed axes of the pivotal lever and a second cylinder, which may be fixed, and accordingly cannot feasibly vary the ratio of proportions throughout an infinite range.

James et al discloses an interesting ratio proportioning system that can be readily adjusted to vary the proportions of delivered fluid throughout any range. This system utilizes variable speed worm gears driven by separate motors for driving the pistons of delivery cylinders at various ratios. The James concept has been considered by the inventors of the present invention and discarded because there are too many mechanical parts that would require precision manufacturing in order to obtain the essentially instant buildup of steady state flow and operating pressure. Also the difficulty and expense required to obtain precision electric motor speed control rule out such a system for laboratory scale RIM operations.

DETAILED DESCRIPTION OF THE DRAWINGS

It is to be understood that the invention is not limited in its application to the specific details described herein, since the invention is capable of other embodiments and of being practiced or carried out in various ways, and that the phraseology or terminology employed herein is for the purpose of describing the invention claimed in the appended claims.

Figure 1:
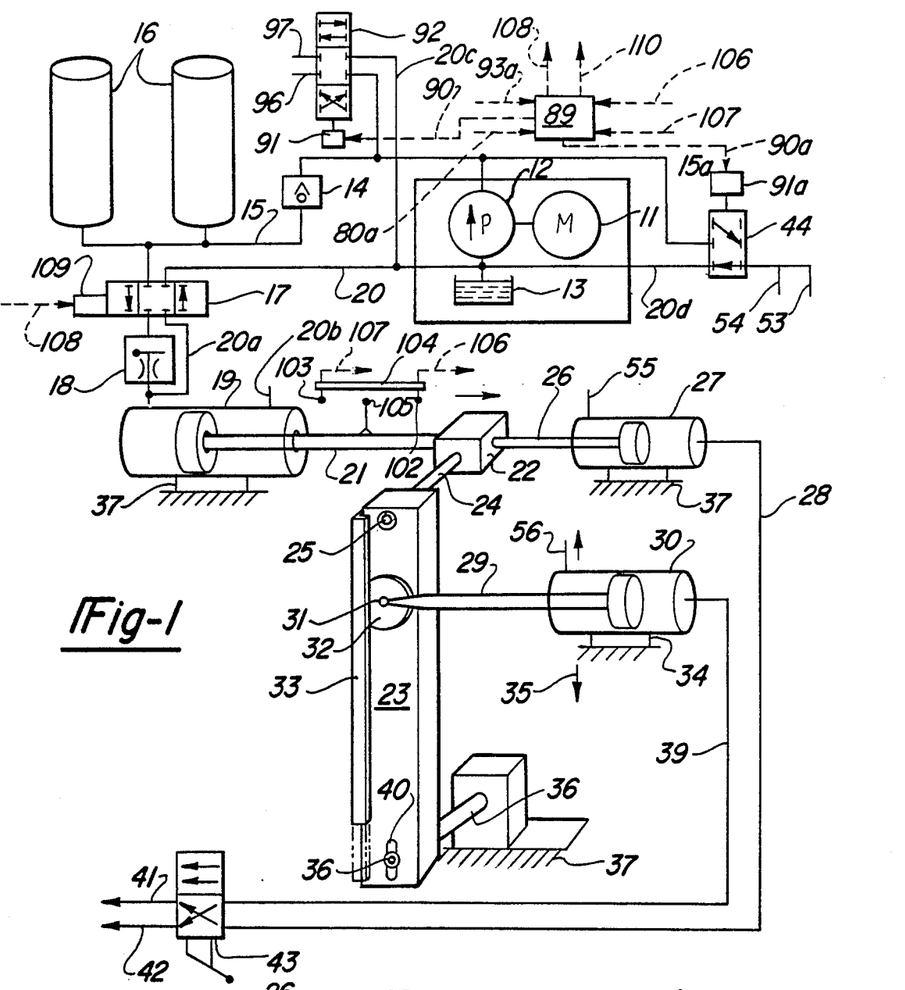
FIG. 1 is a schematic view illustrating a ratio proportioning system embodying the present invention.

Referring to the drawings, the ratio proportioning system of the present invention is schematically illustrated in FIG. 1 wherein a power unit comprises an electric motor 11 operatively connected with a hydraulic pump 12 that discharges hydraulic fluid from a reservoir 13 through a one way check valve 14 in hydraulic power line 15. The latter is connected with a pair of hydraulic pressure accumulators 16 whereby operating pressure can be gradually developed economically by a comparatively small motor 11 and pump 12. Power line 15 continues in parallelism with the accumulators 16 through a control valve 17 and a temperature-pressure compensated flow control device 18 to a primary hydraulic power cylinder 19. The control device 18 may be conventional and assures hydraulic flow to cylinder 19 at a predetermined controlled rate regardless of operational variations in the pressure and temperature in accumulators 16 as long as their pressure is above the minimum required to drive the mechanism appropriately.

When valve 17 is in the closed position shown, flow to primary drive cylinder 19 is blocked and the accumulators 16 are charged with pressurized fluid. When valve 17 is moved to the right, hydraulic fluid flows through the device 18 and into the left end of cylinder 19 to drive its piston rightward. The right end of cylinder 19 is air filled and connected to atmosphere at vent 20b. When valve 17 is shifted to the left at the end of a molding shot, pressurized flow from the accumulators 16 is closed and hydraulic fluid flow from the left end of cylinder 19 is directed to reservoir 13 via lines 20a and 20. The piston in cylinder 19 thus becomes essentially free floating.

When pressurized fluid enters the left end of cylinder 19, the piston therein and connected rod 21 are forced to the right. The outer rightward end of rod 21 is rigidly connected at 22 to the upper end of an extensible pivotal lever 23 by means of a connecting rod 24 journaled at 25 in the upper end of lever 23. The connector 22 is also rigidly connected to a piston rod 26 of a driven piston in hydraulic delivery cylinder 27, such that rightward movement of rod 21 moves rod 26 and its connected piston coaxially within the cylinder 27 to the right, thereby discharging hydraulic fluid from cylinder 27 via hydraulic line 28.

Also operated conjointly with the pivoting of lever 23 is a connecting rod 29 for a driven piston within hydraulic delivery cylinder 30. The outer or left end of rod 29 is pivotally connected at 31 coaxially to a roller 32. The roller 32 rides within a channel extending lengthwise of the lever 23 between the latter and a guide rail 33 secured to the lever 23. The assembly of the parts 29, 30, 31, and 32 is supported by a vertically adjustable platform 34 which enables movement of these parts bodily in the direction of the arrows 35, i.e. lengthwise of the lever 23 or radially of its fixed pivot axis 36. The cylinders 19 and 27 and the fixed pivot 36 are supported on a fixed frame 37. It is thus apparent that when rod 21 is moved to the right, lever 23 will swing clockwise in FIG. 1 about its fixed pivot 36 so as to move rods 26 and 29 simultaneously to the right. Similarly to rod 26, rod 29 extends into cylinder 30 and terminates in a piston for reciprocating coaxially within the cylinder 30. Upon rightward movement of rod 29 and the attached piston, hydraulic fluid is discharged via flexible conduit 39 from the right end of cylinder 30.

Inasmuch as cylinders 19 and 27 are fixed with respect to the axis of pivot 36, when lever 23 swings clockwise, pivot 25 must move radially from pivot 36. Such action is enabled in the present instance by means of slot 40 extending longitudinally of the lever 23 and moveable along the fixed pivot 36. Accordingly lever 23 is referred to herein as an extensible lever because the distance between the axes of the fixed pivot 36 and moveable or swinging pivot 25 increases as the lever 23 swings from the position illustrated in FIG. 1.

Figure 2:
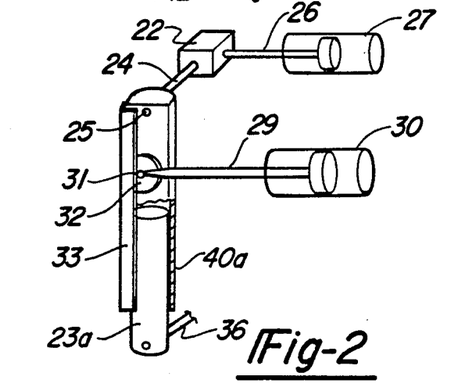
FIG. 2 is a schematic view illustrating parts of a modified ratio proportioning system.

Various extensible devices known to the art and embodying for example accordion type structures, lazy tong structures, or telescoping structures may be substituted for the lever 23, such as the two part telescoping lever illustrated in FIG. 2 wherein a rod 23a is pivotally connected at its lower end to the fixed pivot 36 and telescopes axially into a tubular extension 40a in lieu of the slot 40. The guide 33 is secured longitudinally to extension 40a to provide a guide channel for roller 32 which operates as described above.

Figure 3:
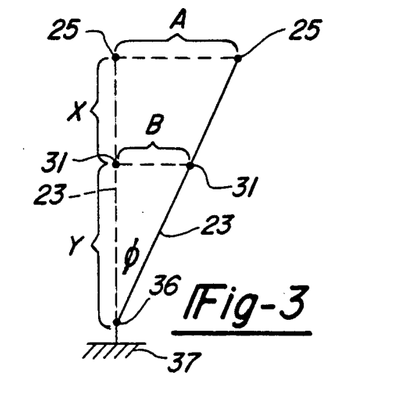
FIG. 3 is a schematic view illustrating the ratio proportioning concept of the present invention.

FIG. 3 illustrates the proportioning function of the present invention in detail. Distance X+Y represents the distance between the axes of pivots 36 and 25. Y represents the distance between the axes of pivots 36 and 31. Upon clockwise pivoting of lever 23 through an angle $\phi$ from the dotted position to the solid position in FIG. 3, the amount of movement of rod 26 and attached piston is represented by the horizontal line A. The corresponding movement of rod 29 and its attached piston is represented by the horizontal line B. It is apparent from the geometry in FIG. 3 that the ratio A:B remains constant for any value of the angle $\phi$. Accordingly the amount of hydraulic fluid discharged from cylinders 27 and 30 will also be in a fixed ratio determined by the ratio between their internal cross sectional areas and the adjusted position of pivot 31, i.e., the distance Y.

It is also to be noted that if the rod 29, cylinder 30, and roller 32 are raised bodily upwardly by elevating platform 34 to arrange the axes of pivots 31 and 25 coaxially, the rightward movement of the pistons in cylinders 27 and 30 will be in a 1:1 ratio. If the rod 29, cylinder 30, and roller 32 are moved bodily downward by lowering platform 34 until the axes of pivots 31 and 36 are coaxial, rod 29 will not be moved by pivoting of lever 23 and the ratio of fluids discharged from the cylinders 27 and 30 will be 1:0 or infinite. It is thus apparent that by suitably raising or lowering the platform 34, the fluid discharging movement of rod 29 may be varied from 0 to 100% of the corresponding movement of rod 26. Of course the guide 33 for roller 32 may be extended upwardly in FIG. 1 beyond the pivot 25 so as to enable adjustment of pivot 31 to a position above pivot 25, thereby to increase the movement of rod 29 with respect to rod 26, but such an extension is unnecessary because a superior effect can be achieved by interchanging the output from cylinders 27 and 30 within the injection molding system illustrated in FIG. 4, as explained below.

In accordance with an important concept of the invention, the adjustable fluid dispensing cylinder 30 and its connector 29 are moveable bodily in a plane parallel to the axes of both the fixed pivot 36 and cylinder 27. This concept in combination with the extensible lever 23 enables the above described essentially unlimited range of fluid output ratios with optimum structural simplicity. Although one fixed cylinder 27 and one adjustable cylinder 30 are illustrated, additional fixed or adjustable fluid dispensing cylinders may be similarly provided. Also in the preferred embodiment illustrated, the operating means, i.e., the lever 23 and roller 32 for the connectors 26 and 29, are in driving engagement with these connectors at the axes of the pivots 25 and 31 respectively, which axes are in a common plane with the axis of pivot 36. The axes of pivot 36 and the connectors 26 and 29 also preferably lie in parallel planes.

Hydraulic lines 28 and 39 are connected to hydraulic lines 41 and 42 by means of a manually operated directional control valve 43. In the elevated valve position shown, fluid from cylinder 27 is discharged via line 28 through valve 43 into line 41. Fluid from cylinder 30 is conducted by line 39 through valve 43 to line 42. When valve 43 is shifted to its lower position, lines 28 and 39 are connected directly to lines 42 and 41.

Figure 4:
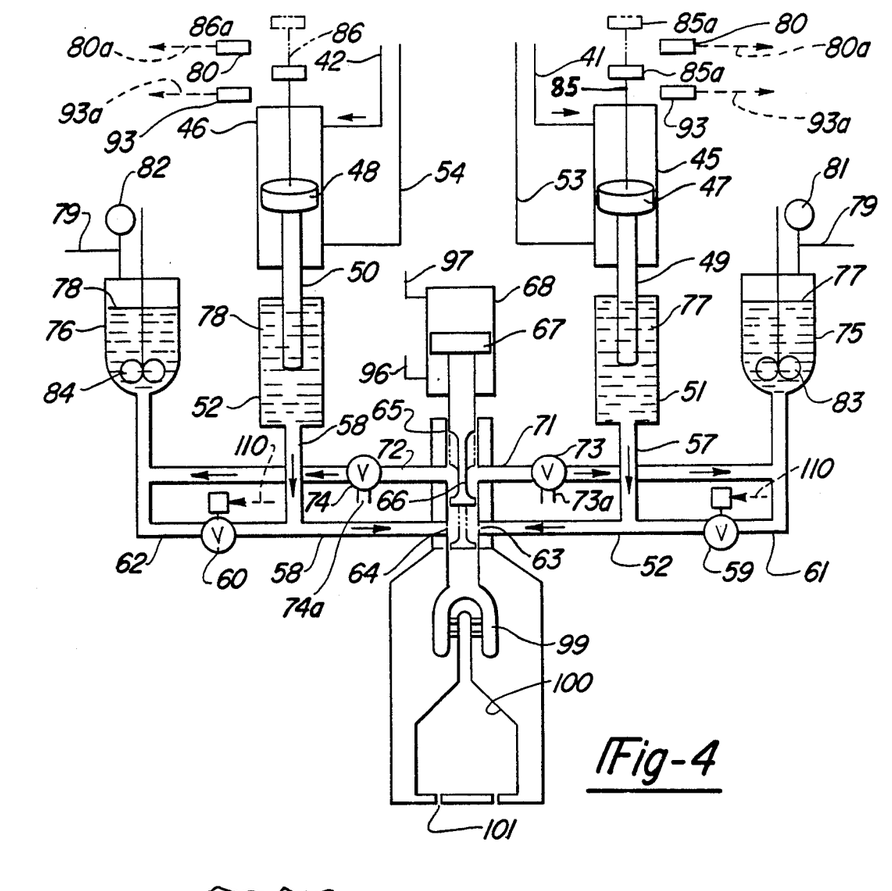
FIG. 4 is a schematic view illustrating the RIM component delivery system of the present invention.

Referring now to FIG. 4, hydraulic lines 41 and 42 are connected respectively with the upper ends of hydraulic lance drive cylinders 45 and 46 containing reciprocating pistons 47 and 48 connected with lances 49 and 50. The latter extend through suitable seals from the lower ends of cylinders 45 and 46 respectively into the upper ends of fluid component delivery cylinders 51 and 52 respectively. Downward movement of the pistons 47 and 48 is enabled by hydraulic return lines 53 and 54 which connect the lower ends of cylinders 45 and 46 through valve 44 in the raised position shown, FIG. 1, to the reservoir 13 via line 20d.

At the end of a molding shot as described below, valve 17 is moved to its leftward position to connect the left end of cylinder 19 to reservoir 13 via lines 20a and 20 and valve 44 is shifted to its lower position whereat pressurized fluid is conducted from pump 12 via line 15a and lines 53, 54 to the lower ends of cylinders 45 and 46 to return lance pistons 47 and 48 to their upper positions and thereby to return the fluid above pistons 47 and 48 via lines 41 and 42 and valve 43 to the right ends of cylinders 27 and 30. The pistons in the latter cylinders and the free floating piston in cylinder 19 are then driven leftward.

By suitably adjusting valve 43, the fluid discharged from cylinder 30 by operation of the slower moving rod 29 (relative to rod 26) can be directed into and received from the upper end of either cylinder 45 or 46. Similar remarks are true in regard to cylinder 27. Thus the component discharged from either component delivery cylinder 51 or 52 can be readily varied from zero to 100% of the other without interchanging the components in these cylinders and without the consequent necessity of thoroughly cleaning these cylinders before making the exchange, as described above.

Figure 5:
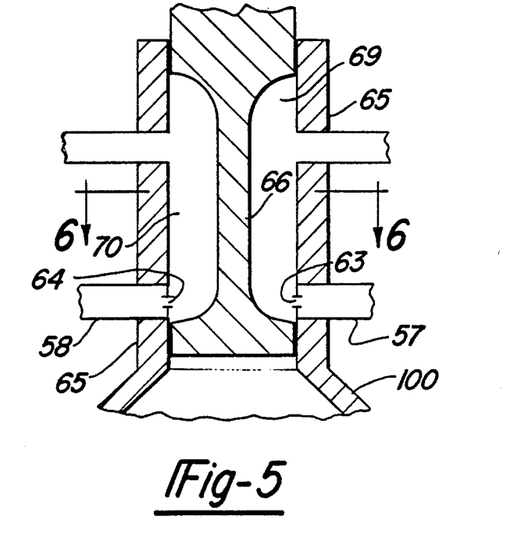
FIG. 5 is a schematic view on an enlarged scale illustrating the wipe piston or mixing head valve for controlling component flow to the mold.
Figure 6:
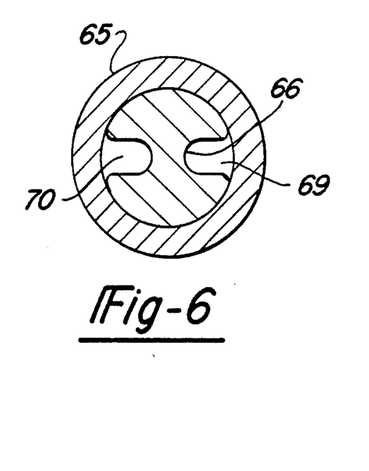
FIG. 6 is a sectional view taken in the direction of the arrows essentially along the lines 6—6 of FIG. 5.

The fluid chemical components to be reacted together in the injection molding process are contained in the two separate component delivery cylinders 51 and 52 and are discharged therefrom into conduits 57 and 58 in a ratio determined by the relative rate of movement of the lances 49 and 50, which in turn is determined by the adjusted position of cylinder 30. At the beginning of the injection molding operation, valves 59 and 60 are closed so as to block flow of the fluid component in lines 61 and 62, which branch from conduits 57 and 58. Thus the components discharged from component delivery cylinders 51 and 52 are directed through restricted openings 63 and 64 into a mixing head 65, which is preferably conventional in construction. The latter contains the mixing head valve comprising a cylindrical wipe piston 66 reciprocated by attachment to an operating piston 67 reciprocal within hydraulic cylinder 68. At the beginning of the injection molding operation, the wipe piston 66 is at the dotted position illustrated in FIG. 4 whereat its separated channels or passages 69 and 70 communicate with the restrictions 63 and 64 respectively, FIGS. 5 and 6, and conduct the separate fluid components to conduits 71 and 72 respectively. Except for the channels 69 and 70, the wipe piston 66 is in close sliding and sealing engagement with the interior bore of mixing head 65.

At the initial dotted position of wipe piston 66, FIG. 4, downward flow of the fluid component in the cylindrical bore of mixing head 65 from the restrictions 63 and 74 is blocked by the closely fitting lower cylindrical end of the piston 66. Likewise upward flow of the fluid component within mixing head 65 above the conduits 71 and 72 is also blocked by the closely fitting upper cylindrical portion of the piston 66. The separate fluid components flow via conduits 71 and 72 and valves 73 and 74 to their respective component storage tanks 75 and 76 until predetermined steady state flow rates and pressures are obtained in lines 57 and 58.

The tanks 75 and 76 contain fluid components 77 and 78 of the same kind contained in delivery cylinders 51 and 52 respectively and are under pressure of an inert gas, such as nitrogen gas, at separate pressures if desired supplied via pressurized gas line 79 and regulated by pressure regulators 81 and 82. The storage tanks 75 and 76 may be conventional, of about two liter capacity, heated in accordance with conventional practice, and provided with agitators 83 and 84 for maintaining the homogeneity of the fluid chemicals 77 and 78.

When the flow of fluid chemical components from the delivery cylinders 51 and 52 attains a predetermined steady rate and pressure, the wipe piston 66 is retracted to the raised position, solid lines FIG. 4. Tail rods 85 and 86 extend axially upward through suitable seals in the upper ends of cylinders 45 and 46 and carry metallic signal actuators 85a and 86a respectively. Associated with each of the rods 85 and 86 is an electro-magnetic proximity switch 80 responsive to the proximity of the actuators 85a and 86a and adjustable to positions axially of the rods 85 and 86. The switch 80 (associated with the piston 47 or 48 intended to move the most rapidly and farthest during a molding operation or "shot") is adjusted axially to a position adjacent to the rod 85 or 86 so as to be responsive to the actuator 85a or 86a of the fastest moving piston 47 or 48 after the latter piston has moved downwardly from the starting position, shown in phantom, for a distance sufficient to assure that the desired steady state flow rate and molding pressure has been obtained. When the most rapidly moving piston 47 or 48 has moved downwardly for the aforesaid sufficient distance, the proximity switch 80 is activated to send a signal to a control system or panel 89 via the connection indicated schematically by the dotted line 80a.

By virtue of the restrictions 63, 64, the pressure amplification effected by the cross sectional area differential between the pistons 47, 48 and lances 49, 50, and the closed hydraulic circuitry described which avoids play or lost motion otherwise associated with mechanical linkages, the desired steady state rate of flow and high pressure required for the RIM operation is obtained almost immediately and shortly after initiation of the operation by shifting valve 17 to the right. Consequently, a minimum volume of fluid chemical components is directed thru passages 71, 72 to the storage tanks 75, 76 before the steady state flow rate and high operating pressure is achieved. The primary delay in obtaining the desired steady state flow rate results because a small quantity of monomer is required to fill the space resulting from its nominal compression after initiation of the molding shot, and the expansion of the monomer delivery system at the high molding pressure, as noted above.

When control panel 89 receives the aforesaid signal from proximity switch 80, indicating that the associated rod 85 or 86 has traveled sufficiently to assure that the steady state operating pressure has been obtained in both lines 57 and 58, it transmits a valve operating signal via connection 90, indicated schematically by a dotted line, to valve actuator 91. Actuator 91 then shifts valve 92 to its lower position to connect the lower and upper ends respectively of cylinder 68 to the pump pressure of line 15 via line 96 and to reservoir 13 via lines 97, 20. The wipe piston 66 is thus immediately raised to the solid line position shown.

At the raised position of piston 66, the chemical components entering via restrictions 63, 64 impinge on each other at high velocity. They are prevented from flowing upwardly in mixing head 65 and are thus forced downwardly through an aftermixer 99 which effects additional mixing, and thence into the cavity of mold 100. When the latter is filled, piston 66 is again returned immediately to the lower dotted position to prevent additional flow via restrictions 63 and 64 into the mold 100. The wipe piston 66 closely conforms to the interior of the mix head 65 and as it moves downwardly to the dotted position, it wipes the underlying portions of the mixing head bore clean and forces excess components from the mix head below the lower end of piston 66 toward the mold cavity 100, thereby to clear the mix head 65 from mixed monomers that could harden in a matter of seconds, to assure complete filling of the mold cavity 100, and to extrude excess portions of the chemical components from the mold cavity via the air vents 101.

Return of the wipe piston 66 to the dotted position shown is controlled by operation of an electromagnetically actuated proximity switch 93 adjustable axially of rods 85 and 86 to respond to the actuator 85a or 86a of the fastest to move piston 47 or 48 when that piston has moved sufficiently to cause filling of the mold 100. The proximity switch 93 then sends a signal to the control panel 89 via the connection 93a indicated schematically by the dotted line. The control panel 89 relays a signal via connection 90 to valve actuator 91, which shifts valve 92 upward to connect the upper end of cylinder 68 to pump pressure from line 15 via line 97, and to connect the lower end via lines 96 and 20c to reservoir 13, thereby to cause the aforesaid shifting of piston 66 to its lower dotted position, FIG. 4. Discharge of the monomers from cylinders 51 and 52 will continue as at the beginning of the molding shot and the separate monomers will circulate through restrictions 63, 64 and lines 71, 72 to their respective reservoirs 75, 76.

The entire molding shot will usually require only a couple of seconds, say from approximately one-half to three seconds. Shortly after the flow to the mold 100 is stopped, an electro-magnetic proximity switch 102, adjustable lengthwise of piston rod 21 along a fixed support 104 to a preselected limit-of-movement position, is energized by a metallic actuator 105, secured to rod 21, when the latter reaches said preselected limit of movement. The energized switch 102 relays a signal via connection 106 to panel 89, which in turn sends a signal via connection 108 to switch actuator 109 to move switch 17 leftward and connect the left end of cylinder 19 to drain via lines 20a and 20. (Connections 106 and 108 are indicated schematically by dotted lines.)

Simultaneously with the signal to 109, the panel 89 sends a signal via connection 90a to actuator 91a to shift valve 44 downward and connect the pump pressure via line 15a to lines 53 and 54, thereby to force pistons 47, 48 upwardly and return the hydraulic fluid above the latter pistons back to the right ends of delivery cylinders 27 and 30 via their respective lines 41, 28 and 42, 39. The hydraulic fluid returned to the right ends of cylinders 27, 30 forces their pistons and rods 26, 29 leftward, returning lever 23 and the free floating piston in cylinder 19 to the starting position. Air vents 55 and 56 at the left ends of cylinders 29 and 30 facilitate leftward movement of the pistons on cylinders 27 and 30. Ordinarily no hydraulic fluid will exist in the right end of cylinder 19 or in the left ends of cylinders 27 and 30, except in consequence of possible slow leakage over an extended time period. If desired the vents 20b, 55, 56 may be connected to reservoir 13.

When the leftward movement of connecting rod 21 reaches a preselected limit, metallic actuator 105 will energize proximity switch 103, adjustably located on support 104, to send a signal via connection 107, schematically illustrated by the dotted line, to control panel 89 which will then relay signals via connections 90a and 108 to valve operators 91a and 109 respectively, thereby to shift valves 44 and 17 to their starting positions, FIG. 1, and stop the movement of lance pistons 47, 48 and the piston in cylinder 19.

Meanwhile, simultaneously with the shifting of valve 44 downwardly (to move the lances 49 and 50 upwardly) in response to energizing the proximity switch 102 by actuator 105, the signal via connection 106 also causes panel 92 to send signals via connection 110, illustrated schematically by dotted lines, to valves 59 and 60 to open the same and connect the component delivery cylinders 51, 52 to their reservoirs 75, 76. As the lances 49, 50 move upwardly, their volume removed from cylinders 51 and 52 is replaced by component from the reservoirs 75, 76. When the upward movement of lances 49, 50 stops as a result of energizing proximity switch 103, the resulting signal to panel 89 via connection 107 will cause panel 89 to send a signal via connection 110 to close valves 59 and 60, as at the beginning of the operation.

Valves 73 and 74 in lines 71 and 72 may be actuated through the control panel 89 and are normally open to permit component flow from mixing head 65 to reservoirs 75, 76 when piston 66 is in the dotted position. If it is desired to monitor the component flow that would otherwise occur during a molding operation, the valves 73 and 74 are operated (i.e. by rotating 90° clockwise) to connect the mixing head 65 with outlets 73a and 74a and block flow to reservoirs 75, 76, whereby the rate of component flow from outlets 73a, 74a can be readily measured. During the monitoring, piston 66 remains at the dotted position. Otherwise the systems may operate as described above.

Any suitable sensing and control means known to the art for effecting the sequential operation of the valves and pistons described may be employed with the fluid circuits and hydraulic components embodying the present invention. Accordingly, the specific sensing and control means for effecting the operational sequence described form no part of the present invention and are merely shown schematically by way of example.

Briefly summarizing the operation of the RIM apparatus described, air is purged from the system by filling the cylinders 51, 52, storage tanks 75, 76, and supply lines to the mold 100 with the monomer components to be reacted. Motor 11 is started to pressurize the accumulators 16. Thereafter a molding shot is initiated by manually actuating control panel 89 to move valve 17 to its rightward position. Pressurized hydraulic fluid is discharged from accumulators 16 at a controlled rate via device 18 into primary drive cylinder 19 to cause clockwise swinging of lever 23 and a preselected proportioned flow of hydraulic fluid from cylinders 27, 30 (depending upon the adjusted position of cylinder 30) into the lance drive cylinders 45, 46. The lances 49, 50 serve as pressure amplifiers, which may provide a molding pressure up to about 3500 psi, and force the component monomers from cylinders 51, 52 into lines 57, 58 toward restricted orifices 63, 64, which result in the aforesaid rapid pressure buildup to the desired steady state condition.

Meanwhile, the fluid components entering mix head 65 via restrictions 63, 64 remain separated and are forced upwardly into conduits 71, 72 via the separate passages 69, 70 in piston 66. When at least one of the pistons 47, 48 (preferably the fastest to move) has traveled downwardly sufficiently to assure the necessary steady state pressure and flow from cylinders 51, 52, piston 66 is rapidly raised to the solid line position shown, forcing the fluid components through the mixing head 65 and aftermixer 99 into the mold 100. When the mold 100 is filled, piston 66 is rapidly returned to the starting positions, dotted lines, to stop the flow of monomers into mold 100 and to clear the mixing head from mixed monomers. Thereafter, upon continued downward movement of lances 49, 50, the monomers discharged from cylinders 51, 52 circulate back to their respective reservoirs 75, 76.

After the molding operation stops, the valves 59, 60, which are initially closed at the start of the molding shot, are opened. The pressure from pump 12 may then be directed into the lower ends of cylinders 45, 46 to raise the lances 49, 50. The space within cylinders 51, 52 vacated by the rising lances 49, 50 is refilled with component from storage tanks 75, 76 via lines 61, 62 and the open valves 59, 60. Hydraulic fluid above the pistons 47, 48 is returned to the right ends of cylinders 27, 30 to return their pistons, the piston in cylinder 19, and also lever 23 to their starting position.

The extensible lever 23 moveable along its fixed pivot 36 within slot 40, in the arrangement described, enables a wide range of flow proportions that can be readily obtained by moving cylinder 30 and its associated connecting rod radially of the fixed pivot 36 to a selected position of adjustment with respect to lever 23 and cylinder 27. Ratios of 1:1, 15:1 or larger can be readily obtained, and these ratios can easily be reversed by adjusting valve 43.

The hydraulic driving relationship between the proportioning cylinders 27, 30 and lance drive cylinders 45, 46 enable the latter and the component delivery cylinders 51, 52 to be located closely to the mold 100 to minimize the length of component lines to the mold and thereby minimize the amount of component required for molding a plaque suitable for laboratory testing. The use of comparatively incompressible hydraulic fluid in cylinders 19, 27, 30, 45, and 46 enables a faithful reproduction of the initial flow proportions from the cylinders 27 and 30 to the component delivery cylinders 51, 52.

We claim:

1. In an apparatus for dispensing a plurality of fluids at selected variable rates, the combination of a separate delivery cylinder and associated fluid actuated delivery piston for each fluid and operative for discharging fluid from each cylinder at a rate proportional to the rate of movement of the associated piston within the cylinder, means for supporting the axis of each cylinder at a selected position spaced radially from a reference axis including means for supporting at least one of said cylinders at a selected position adjustable radially with respect to said reference axis and the axis of another of said cylinders, separate connector means connected with each piston for moving therewith, and operating means in driving engagement with each connector means for effecting said movement of the connected piston at a rate proportional to the radial distance from said reference axis to said driving engagement.

2. The combination according to claim 1, said operating means comprising lever means pivotal about said reference axis, and means associated with said lever means for accommodating variation in the distance between said reference axis and said driving engagement with each connector means upon pivoting of said lever means about said reference axis.

3. The combination according to claim 2, each connector means being movable with its connected piston axially of the associated cylinder and being pivotal with respect to said lever means at said driving engagement therewith for pivoting about a swinging axis upon pivoting of said lever means.

4. The combination according to claim 3, said reference axis being fixed and in a common plane with each swinging axis, the axes of said cylinders and said reference axis lying in parallel planes.

5. The combination according to claim 4, a mold, a separate hydraulically actuated system associated with each delivery cylinder for receiving the hydraulic fluid discharged therefrom and operative for discharging a fluid chemical component to said mold proportionately to the hydraulic fluid received from the associated delivery cylinder.

6. The combination according to claim 5, each system comprising a lance operating cylinder connected with an associated delivery cylinder by said hydraulic coupling means for receiving the hydraulic fluid discharged from the associated delivery cylinder, a lance piston movable axially within said lance operating cylinder proportionally to said fluid discharged thereinto from the associated delivery cylinder, a component delivery chamber containing said fluid component, a lance connected with said lance piston for moving axially therewith and extending in sealing relationship from said lance operating cylinder into said component delivery chamber for displacing fluid component therefrom proportionally to the movement of said lance thereinto, and means for connecting said mold with said component delivery chamber for discharging the fluid component displaced therefrom into said mold.

7. The combination according to claim 6, a mixing head having a cylindrical bore opening into said mold, said means for connecting said mold with said component delivery chamber comprising a restricted conduit connected with said cylindrical bore, a wipe piston movable axially within said bore between a first position for blocking the opening of said bore into said mold and a second position for connecting said bore with said mold, a reservoir for fluid component of the kind discharged from said component delivery chamber, a component return conduit for connecting said reservoir with said mixing head, a conduit defined in said mixing head by said wipe piston for connecting said restricted conduit with said component return conduit when said wipe piston is at said first position, said wipe piston at said second position blocking communication between said restricted conduit and component return conduit.

8. The combination according to claim 7, and hydraulic coupling means operative for selectively interconnecting the hydraulically actuated systems with the separate delivery cylinders respectively in various combinations.

9. The combination according to claim 7, means for maintaining said wipe piston at said first position until the component flow in said restricted conduit attains a predetermined steady state, and means for moving said wipe piston to said second position when said component flow attains said steady state.

10. The combination according to claim 9, and hydraulic coupling means operative for selectively interconnecting the hydraulically actuated systems with the separate delivery cylinders respectively in various combinations.

11. The combination according to claim 1, a mold, a separate hydraulically actuated system associated with each delivery cylinder for receiving the hydraulic fluid discharged therefrom and operative for discharging a fluid chemical component to said mold proportionately to the hydraulic fluid received from the associated delivery cylinder, and hydraulic coupling means operative for selectively interconnecting the separate hydraulically actuated systems with the separate delivery cylinders respectively in various combinations.

12. The combination according to claim 11, said hydraulic coupling means comprising conduits for connecting said systems and delivery cylinders, and valve means for selectively reversing the connection between at least two of the systems and delivery systems.

13. The combination according to claim 11, each system comprising a lance operating cylinder connected with an associated delivery cylinder by said hydraulic coupling means for receiving the hydraulic fluid discharged from the associated delivery cylinder, a lance piston movable axially within said lance operating cylinder proportionally to said fluid discharged thereinto from the associated delivery cylinder, a component delivery chamber for containing said fluid component, a lance connected with said lance piston for moving axially therewith and extending in sealing relationship from said lance operating cylinder into said component delivery chamber for displacing fluid component therefrom proportionally to the movement of said lance thereinto, and means for connecting said mold with said component delivery chamber for discharging the fluid component displaced therefrom into said mold.

14. The combination according to claim 13, a mixing head having a cylindrical bore opening into said mold, said means for connecting said mold with said component delivery chamber comprising a restricted conduit connected with said cylindrical bore, a wipe piston movable axially within said bore between a first position for blocking the opening of said bore into said mold and a second position for connecting said bore with said mold, a reservoir for fluid component of the kind discharged from said component delivery chamber, a component return conduit for connecting said reservoir with said mixing head, a conduit defined in said mixing head by said wipe piston for connecting said restricted conduit with said component return conduit when said wipe piston is at said first position, said wipe piston at said second position blocking communication between said restricted conduit and component return conduit.

15. The combination according to claim 14, means for maintaining said wipe piston at said first position until the component flow in said restricted conduit attains a predetermined steady state, and means for moving said wipe piston to said second position when said component flow attains said steady state.

16. The combination according to claim 1, a mold, a separate hydraulically actuated system associated with each delivery cylinder for receiving the hydraulic fluid discharged therefrom and operative for discharging a fluid chemical component to said mold proportionately to the hydraulic fluid received from the associated delivery cylinder, each system comprising a lance operating cylinder connected with an associated delivery cylinder by said hydraulic coupling means for receiving the hydraulic fluid discharged from the associated delivery cylinder, a lance piston movable axially within said lance operating cylinder proportionally to said fluid discharged thereinto from the associated delivery cylinder, a component delivery chamber for containing said fluid component, a lance connected with said lance piston for moving axially therewith and extending in sealing relationship from said lance operating cylinder into said component delivery chamber for displacing fluid component therefrom proportionally to the movement of said lance thereinto, and means for connecting said mold with said component delivery chamber for discharging the fluid component displaced therefrom into said mold.

17. The combination according to claim 16, a mixing head having a cylindrical bore opening into said mold, said means for connecting said mold with said component delivery chamber comprising a restricted conduit connected with said cylindrical bore, a wipe piston movable axially within said bore between a first position for blocking the opening of said bore into said mold and a second position for connecting said bore with said mold, a reservoir for fluid component of the kind discharged from said component delivery chamber, a component return conduit for connecting said reservoir with said mixing head, a conduit defined in said mixing head by said wipe piston for connecting said restricted conduit with said component return conduit when said wipe piston is at said first position, said wipe piston at said second position blocking communication between said restricted conduit and component return conduit.

18. The combination according to claim 17, means for maintaining said wipe piston at said first position until the component flow in said restricted conduit attains a predetermined steady state, and means for moving said wipe piston to said second position when said component flow attains said steady state.

* * * * *